(12) United States Patent
Tokarz et al.

(10) Patent No.: US 11,709,943 B2
(45) Date of Patent: Jul. 25, 2023

(54) SECURITY ASSESSMENT SCHEDULING TOOL

(71) Applicant: Bank of America Corporation, Charlotte, NC (US)

(72) Inventors: Steven Tokarz, Chicago, IL (US); Steven George, Miami, FL (US)

(73) Assignee: Bank of America Corporation, Charlotte, NC (US)

( * ) Notice: Subject to any disclaimer, the term of this patent is extended or adjusted under 35 U.S.C. 154(b) by 217 days.

(21) Appl. No.: 16/990,048

(22) Filed: Aug. 11, 2020

(65) Prior Publication Data

US 2022/0050901 A1 Feb. 17, 2022

(51) Int. Cl.
*G06F 21/57* (2013.01)
*G06Q 10/0631* (2023.01)

(52) U.S. Cl.
CPC ..... *G06F 21/577* (2013.01); *G06Q 10/06313* (2013.01); *G06Q 10/06316* (2013.01); *G06F 2221/033* (2013.01)

(58) Field of Classification Search
CPC ............ G06F 21/577; G06Q 10/06316
See application file for complete search history.

(56) References Cited

U.S. PATENT DOCUMENTS

| | | |
|---|---|---|
| 5,596,502 A | 1/1997 | Koski et al. |
| 5,630,070 A | 5/1997 | Dietrich et al. |
| 6,836,689 B2 | 12/2004 | Walser et al. |
| 7,346,929 B1 * | 3/2008 | Hammond ............ G06F 21/552 713/188 |
| 7,941,236 B2 | 5/2011 | Spearman |
| 8,412,551 B2 | 4/2013 | Feng et al. |
| 8,595,846 B1 * | 11/2013 | Etheredge ........... H04L 63/1416 726/26 |
| 9,224,121 B2 | 12/2015 | Li et al. |
| 9,792,568 B2 | 10/2017 | Chen et al. |
| 10,620,993 B2 | 4/2020 | Cardonha et al. |
| 11,271,961 B1 * | 3/2022 | Berger .................... G06F 9/451 |
| 2008/0010225 A1 * | 1/2008 | Gonsalves ............. G06N 7/005 706/11 |

(Continued)

OTHER PUBLICATIONS

Jan Weglarz et al, Project scheduling with finite or infinite number of activity processing modes—A survey, European Journal of Operational Research 208 (2011) 177-205 (Year: 2011).*

(Continued)

*Primary Examiner* — Andre D Boyce
(74) *Attorney, Agent, or Firm* — Banner & Witcoff, Ltd.

(57) ABSTRACT

A security assessment scheduling tool uses a configuration file that is configurable via a user interface, to specify one or more elements of an application to be analyzed during the scoping process. Further, the security assessment scheduling tool may automatically schedule assessments for large numbers of applications using one or more constraining optimization techniques and/or via modeling the scheduling problem as an RCPSP problem. The security assessment scheduling tool processes the RCPSP problem for a defined period of time and then schedules remaining unscheduled applications within a specified time period thereby allowing the security assessment scheduling tool to schedule assessments of tens of thousands of applications.

18 Claims, 9 Drawing Sheets

(56) References Cited

U.S. PATENT DOCUMENTS

| | | | |
|---|---|---|---|
| 2009/0007246 A1* | 1/2009 | Gutowski | H04L 63/20 |
| | | | 726/6 |
| 2011/0093955 A1* | 4/2011 | Chen | G06F 21/577 |
| | | | 726/25 |
| 2013/0097706 A1* | 4/2013 | Titonis | G06F 21/566 |
| | | | 726/22 |
| 2014/0137257 A1* | 5/2014 | Martinez | H04L 63/1433 |
| | | | 726/25 |
| 2014/0245376 A1* | 8/2014 | Hibbert | G06F 21/577 |
| | | | 726/1 |
| 2015/0088597 A1* | 3/2015 | Doherty | G06Q 10/0635 |
| | | | 705/7.28 |
| 2015/0237063 A1* | 8/2015 | Cotton | H04L 63/1433 |
| | | | 726/25 |
| 2016/0246966 A1* | 8/2016 | Batrouni | G06F 21/6245 |
| 2017/0277609 A1* | 9/2017 | Slik | G06F 11/2094 |
| 2017/0279920 A1* | 9/2017 | Wood | H04L 43/0864 |
| 2018/0025458 A1* | 1/2018 | Swamy | G06Q 10/101 |
| | | | 705/7.26 |
| 2019/0227533 A1 | 7/2019 | Shih et al. | |
| 2020/0092319 A1* | 3/2020 | Spisak | G06N 7/00 |
| 2020/0356678 A1* | 11/2020 | Gourisetti | G06F 21/577 |
| 2020/0396230 A1* | 12/2020 | Liu | H04L 63/1416 |
| 2021/0224824 A1* | 7/2021 | Bowers | G06F 40/186 |
| 2021/0334386 A1* | 10/2021 | AlGhamdi | G06N 5/04 |

OTHER PUBLICATIONS

Sepehr Proon et al, A Genetic Algorithm with Neighborhood Search for the Resource-Constrained Project Scheduling Problem, Naval Research Logistics, vol. 58 (2011) 73-82 (Year: 2011).*

* cited by examiner

Choose a Scheduling Year

<Current Year>: Make changes to the current year and resolve GAP results

| Globals | Gap | Scoping | Schedule Dates | Export |

<Next Year>: Make changes to the current year and resolve GAP results

| Globals | Scoping | Schedule Dates | Export |

View Historical Scoping and Scheduling Information:

| Year ⌄ |
|---|
| <year> |
| <year> |

FIG. 3

2020 Globals

Globals > Scoping Review > Scheduling Review > Export

Resource Capacity Per Week

|  | Group 1 | Group 2 | Group 3 | Group 4 |
|---|---|---|---|---|
| Internal | 19 | 10 | 3 | 5 |
| Outsource | 0 | 5 | 2 | 0 |
|  | 19 | 15 | 5 | 5 |

Comprehensive

| Comprehensive 1 |
|---|
| Comprehensive 2 |
| Comprehensive 3 |

FIG. 4

2020 Scoping Review

Globals > Scoping Review > Scheduling Review > Export

Search ▼

Show Me: [Unverified (1000)] [Unverified (300)] [In Scope] [Out of Scope] [All] [Comprehensive] [TPIS] [Possible Branding]   Order By: ID ▼

| ID | App Name | Comprehensive | Campaign <Year> | Group | App Manager | |
|---|---|---|---|---|---|---|
| Assessment Type | Assessment Weeks | Outsourced | Branding | Vendor Relationship | TPIS Month | ☐ Verified [Details] |
| 4872 | <Application 1> | N/A | <Campaign 1> | <Group 1> | <Contact email 1> | |
| Type: 1, 2 | # Weeks: 7 | Outsourced: No | Branding: No | Vendor: Develop, Host | TPIS Month: N/A | ☐ Verified [Details] |
| 5524 | <Application 2> | N/A | <Campaign 2> | <Group 2> | <Contact email 2> | |
| Type: 1, 2 | # Weeks: 7 | Outsourced: No | Branding: No | Vendor: Develop, Host | TPIS Month: N/A | ☐ Verified [Details] |
| 7271 | <Application 3> | <id> | <Campaign 2> | <Group 2> | <Contact email 3> | |
| Type: 1, 2 | # Weeks: 7 | Outsourced: No | Branding: No | Vendor: Develop, Host | TPIS Month: N/A | ☐ Verified [Details] |
| 9216 | <Application 4> | N/A | <Campaign 2> | <Group 2> | <Contact email 3> | |
| Type: 1, 2 | # Weeks: 7 | Outsourced: No | Branding: No | Vendor: Develop, Host | TPIS Month: N/A | ☐ Verified [Details] |

<< | First | 1 | 2 | 3 | 4 | 5 | Last | >>

48871 <Application 145>
In Scope ⬤    Verified ☐

Status

Type 1 ☐    Type 3 ☐    Type 5 ☐
Type 2 ☐    Type 4 ☐

Estimated Weeks of Effort [3]    Comprehensive: [<ID>]    Branding: [N]

Primary Information

ID: 48871                ID_2: #N/A              App Name: <Application Name>
Detail 1: <text>         Detail 2: <Text>
Provide for Use          No Contractual Right
App Mgr: <Email Address 10>
Partners: <Email Address 11>, <Email Address 12>, <Email Address 13>

Previous Year

Campaign Start Date: <Date>    Campaign End Date: <Date>   Possible Campaign Changes:
Provide for Use <Year>         Campaign <Year>

Report

Provide For Use           Facing                    Externally Hosted
App Status                Web                       Mobile
<Text>                    <Text>                    <Text>
Projected Production Date Projected Retirement Date Hosting Vnd ID
Hosting Vnd               Managing Vnd ID           Managing Vnd
Dev Vnd ID                Dev Vnd

TPIS

TPIS Proposed for Campaign         TPIS Assessment Month

FIG. 6

Export Data

↓ Download Spreadsheet

Export Preview:

| ID | App Name | Start Date | Assessment Type | Offshore Flag | Offshore Vendor Support | Estimated Weeks | <Year> Completion Date | |
|----|----------|------------|-----------------|---------------|-------------------------|-----------------|------------------------|---|
|    |          |            |                 |               |                         |                 |                        |   |
|    |          |            |                 |               |                         |                 |                        |   |
|    |          |            |                 |               |                         |                 |                        |   |
|    |          |            |                 |               |                         |                 |                        |   |
|    |          |            |                 |               |                         |                 |                        |   |
|    |          |            |                 |               |                         |                 |                        |   |
|    |          |            |                 |               |                         |                 |                        |   |

FIG. 9

SECURITY ASSESSMENT SCHEDULING TOOL

BACKGROUND

Enterprise organizations (e.g., financial institutions, corporations, universities, government agencies, and the like) may provide electronic services, internally and/or externally, via applications running on the enterprise's computing network. To ensure information security, the enterprise organizations may schedule security assessments of each application. For large organizations, such security assessments may need to be scheduled annually for large numbers of applications (e.g., about 2000 security assessments, about 4000 security assessments, and the like) particularly for internal and externally facing applications that are considered high-risk. Such assessments may be difficult and time consuming to schedule, based on the process of looking at the characteristics of applications that might require it to be scheduled for an assessment, along with actually scheduling resources for performing the assessments for the following year, because the scheduling process is subject to multiple constraints such as the varying availability of resources to do the assessments each week as well as the problem of matching assessments to resources with a particular skill set. Further errors are introduced due to the changing conditions experienced over the time necessary for building the schedule, which may take, for example over three months.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with accurately scheduling of security assessments of applications operational in an enterprise computing system. For example, aspects of the disclosure relate to a computer-based application that automatically scopes and schedules security assessments for large numbers of applications in operation on an enterprise computing network.

A security assessment scheduling tool may be used to automatically scope applications operational on an enterprise network and may schedule a timeframe for which resources to perform security assessments. In some cases, the security assessment scheduling tool may include a scoping module and a scheduling module. For example, the scoping module may consider a sizeable number of criteria when scoping an application for a security assessment through the use of a business rules engine and the scheduling module may perform automated scheduling by modeling a scheduling problem through use of a modified subclass of scheduling problems called Resource-Constrained Project Scheduling Problem (RCPSP) that was modified to handle the scheduling of large numbers of assessments (e.g., about 1000, about 4000, about 10,000 and the like).

In some cases, the security assessment scheduling tool may be a single component, or multiple components, to perform different aspects of a security assessment process. For example, a security assessment scheduling tool may include a data aggregation component, an automated scoping component, an automated scheduling component, and a user interface component providing user interface screens to allow a user to review the results generated by the automated components and/or to allow the user to easily modify configurations, schedules and the like.

Scheduling of application security assessments may be performed in compliance with enterprise and/or industry requirements. The security assessment scheduling tool allows for a convenient specification, such as in a configuration file (e.g., stored in a data store, configured via a user interface, automatically configured, and the like), to specify one or more elements of an application to be analyzed during the scoping process. Further, the security assessment scheduling tool may automatically schedule assessments for large numbers of applications using one or more constraining optimization techniques and/or via modeling the scheduling problem as an RCPSP problem. While most RCPSP algorithms, if not all, are not able to solve large datasets within a reasonable amount of time, the security assessment scheduling tool utilizes a novel technique called "guttering" that allows the security assessment scheduling tool to schedule assessments of tens of thousands of applications.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3 shows an illustrative user interface screen for editing security assessment schedules according to one or more aspects described herein;

FIG. 4 shows an illustrative user interface screen for configuring settings for use when automatically generating a security assessment schedule according to one or more aspects described herein;

FIG. 5 shows an illustrative user interface screen for reviewing a security assessment schedule according to one or more aspects described herein;

FIG. 6 shows an illustrative user interface screen for editing a security assessment schedule according to one or more aspects described herein;

FIG. 9 shows an illustrative user interface screen for downloading a security assessment schedule according to one or more aspects described herein;

DETAILED DESCRIPTION

Figure 1:
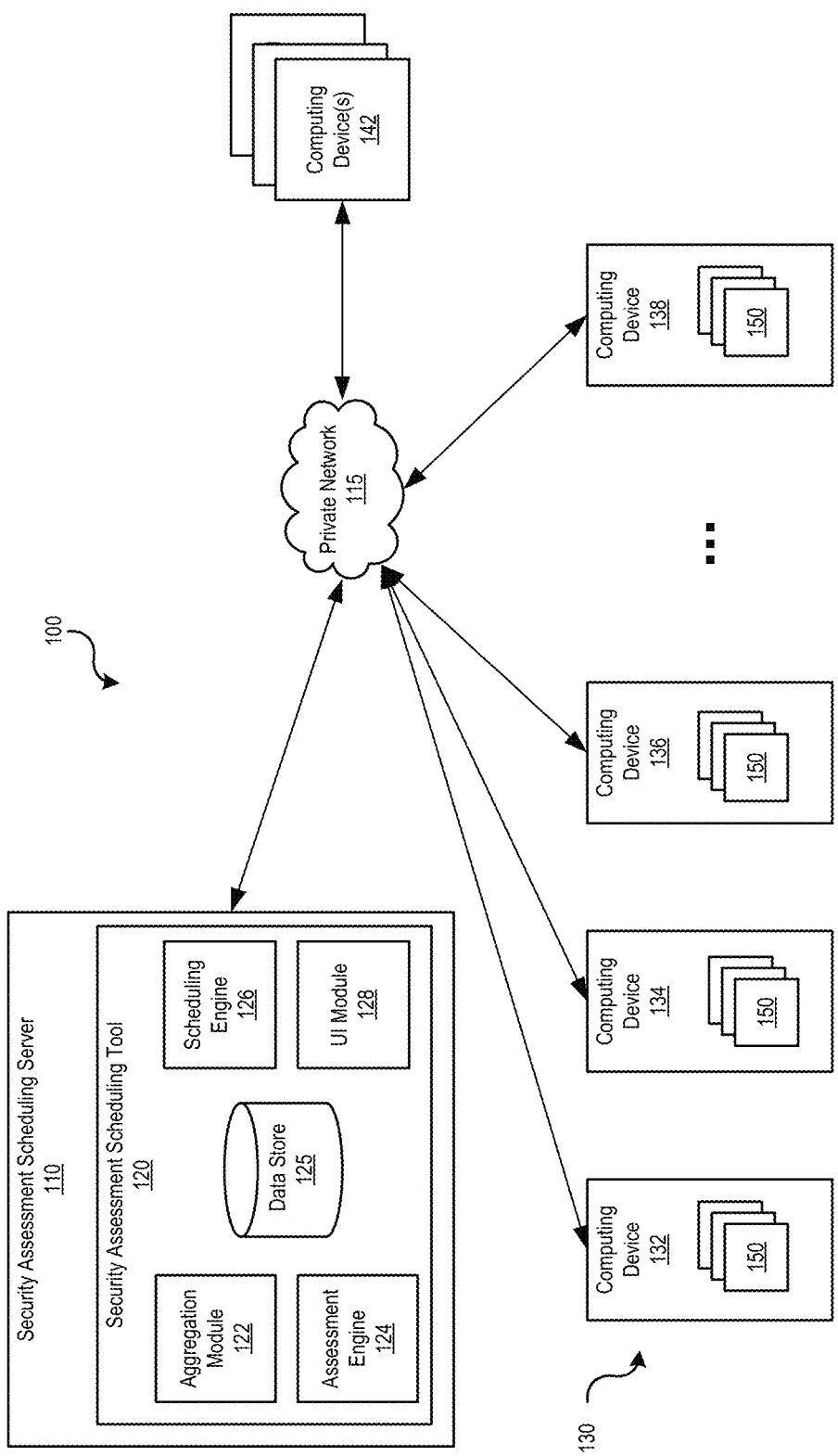
FIG. 1 shows an illustrative computing environment for scheduling security assessments in a networked computing environment in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (i.e., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" or computing devices can include one or more: general-purpose or special-purpose network-accessible administrative computers, clusters, computing devices, computing platforms, desktop computers, distributed systems, enterprise computers, laptop or notebook computers, managing computers, nodes, personal computers, portable electronic devices, servers, worker computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some example arrangements in which the systems described herein may be used. Various other arrangements employing aspects described herein may be used without departing from the invention.

FIG. 1 shows an illustrative computing environment 100 for scheduling security assessments in a networked computing environment in accordance with one or more aspects described herein. the computing environment 100 may include a security assessment scheduling server 110, upon which a security assessment scheduling tool 120 may be installed and/or run. The security assessment scheduling server 110 may be communicatively coupled to other computing devices (e.g., computing devices 130) of an enterprise computing system via one or more networks 115. In some cases, one or more of the computing devices 130 (e.g., a computing device 132, a computing device 134, a computing device 136, a computing device 138 and the like) may include one or more applications 150 that may be used to provide products and/or services to users internal to the enterprise and/or to users external to the enterprise. For example, the security assessment scheduling tool 120 may aggregate information from one or more data sources, such as a database containing an inventory of all custom software created or bought in the enterprise, a database that has all previous application security assessments (e.g., to provide historical context when scheduling), and a database containing additional metadata on the custom applications (e.g., to provide additional context when scheduling), and the like.

Enterprise organizations (e.g., financial institutions, corporations, universities, government agencies, and the like) may provide electronic services, internally and/or externally, via applications running on the enterprise's computing network. To ensure information security, the enterprise organizations may schedule security assessments of each application. For large organizations, such security assessments may be scheduled annually for large numbers of applications (e.g., about 2000 security assessments, about 4000 security assessments, and the like) particularly for internal and externally facing applications that are considered high-risk. Such assessments must be performed manually and may be difficult and time consuming to schedule, based on the process of looking at the characteristics of applications that might require it to be scheduled for an assessment, along with actually scheduling resources for performing the assessments for the following year. Because the scheduling process is subject to multiple constraints such as the varying availability of resources to do the assessments each week as well as the problem of matching assessments to resources with a particular skill set. Further errors are introduced due to the changing conditions experienced over the time necessary for building the schedule, which may take, for example over three months.

Currently, no methods for automatically scoping applications and scheduling of security assessments is commercially available, particularly ones that identify characteristics of individual applications which also consider capabilities and availabilities of personal performing the assessments. As such, a need was recognized for automatic determination of an assessment schedule to facilitate end to end management of security protocols for each application operational on an enterprise computing network. Such end to end management includes automatic scoping of applications to determine whether a security assessment is necessary, nothing out there to do automatically, automatic scheduling of assessments based on the scoping and managing notifications concerning the security assessments to engage end user owners of applications and to interface with the assessment team.

In some cases, the aggregation module 122 may aggregate information associated with each application of a plurality of applications 150 that are accessible via the network. For example, the aggregation module may identify which of the applications 150 may qualify for a security assessment. For example, the aggregation module may identify which of the applications 150 may be accessible to individuals outside the enterprise computing network (e.g., applications accessible via an internet connection) and/or which of the applications 150 may access private or non-public information (e.g., account information, personal identifying information, and the like). For example, an enterprise may have hundreds or thousands of applications (e.g., internally developed applications, externally developed applications, and the like) running on various hosts or servers on the enterprise computing network and the aggregation module 122 may aggregate information (e.g., data access information, network access information and the like) and may store such information in a data store (e.g., data store 124) for further analysis, such as by the assessment engine 122.

The assessment engine 124 may process instructions to analyze at least the stored aggregated information, or other information, to perform scoping of applications automatically. In some cases, assessments may be performed, at least partially, manually where assessments may be assigned based on one of 4 different classes that may include an automated ethical hack (AEH) type, a manual ethical hack (MEH) type, a source code analysis type (SCA), a dynamic security scanning (DSS) type, a functional security risk assessment, and/or the like. In some cases, assessment classes may be different for server-based applications and mobile applications (e.g., MEH mobile, SCA mobile, AEH mobile, and the like). An AEH may be used to uncover less common, high risk vulnerabilities in an application. For example, an AEH assessments may include a dynamic automatic analysis with manual testing (e.g., business logic testing) to mimic possible activities that may be performed by an unauthorized individual attempting to gain access to the enterprise network via application vulnerabilities. In some cases, MEH assessments may involve one or more threat modeling exercises to identify high-risk vulnerabilities that may be used by unauthorized individuals to gain improper access to the enterprise network. The MEH assessments may also include detailed manual testing (e.g., business logic testing) that may be augmented with automated testing, that may be targeted towards the particular application(s) under test, particularly those undergoing major revisions. In some cases, an SCA assessment may be a security assessment that may be used to review source code based on one or more security parameters. A DSS assessment may be used to assess and identify common vulnerabilities for certain applications, such as internally-accessed applications and/or applications assessed to be at lower-risk, but may still need to comply with various regulatory security assessment procedures. In some cases, such as for internally developed applications, a portion of an assessment may be dedicated to source code analysis. Each application may be assigned one or more assessments of different types, where ach assessment is assigned separate resources to perform the assessment and/or must be separately scheduled. In some cases, such as for some automated testing, assessments may be assigned a 1-week time frame. Other assessments (e.g., manual assessments) may require more time and/or resources to be performed. For example, an MEH scheduled for a particular application may be assigned a longer time frame (e.g., between 1-6 weeks) and one or more resources, often depending on the size or complexity of the application and/or potential risk associated with an undiscovered vulnerability that may be improperly used by unauthorized individuals. The assessment engine 124 may store assessment information corresponding to the assessment of the applications 150 operated by the computing devices 130 of the enterprise computing network in the data store 124 for access by the scheduling engine 126 and/or the user interface (UI) module 128.

In some cases, the scheduling engine 126 may process the assessment information stored in the data store 126 and/or information received form the assessment engine 122 to automatically schedule security assessments for the applications 150 over a given time frame (e.g., a year) and to be performed by specific resources during time periods within the time frame. For example, the scheduling engine 126 may process the assessment information using a mathematical algorithm, such as a Resource-Constrained Project Scheduling Problem (RCPSP) and/or a modified RCPSP. RCPSPs are a sub-class of the Scheduling Problem that deals with scenarios where resources (e.g., personnel, automated applications, and the like) that perform tasks are limited and where each activity has a start date, a due date, and a charge associated to delays.

In general, a RCPSP may be used to for scheduling activities (e.g., assessments) based on a limited availability of resources to perform the activity and known durations of such activities when performed by a particular assigned resource, which may be linked by precedence relations.

For example, the scoping module may consider a sizeable number of criteria when scoping an application for a security assessment through the use of a business rules engine and the scheduling module may perform automated scheduling by modeling a scheduling problem through use of a modified subclass of scheduling problems called Resource-Constrained Project Scheduling Problem (RCPSP) that was modified to handle the scheduling of large numbers of assessments (e.g., about 1000, about 4000, about 10,000 and the like).

Informally, a resource-constrained project scheduling problem (RCPSP) considers resources of limited availability and activities of known durations and resource requests, linked by precedence relations. RCPSPs may be used to find a schedule of minimal duration by assigning a start time to each activity such that the precedence relations and the resource availabilities are respected. More formally, the RCPSP can be defined as a combinatorial optimization problem where the solution to the problem can be minimized or maximized. For example, a solution to the RCPSP may be determined by building a feasible schedule by stepwise extension of a partial schedule, where each application or time sequence is scheduled in turn. A serial solution may be accomplished through an assessment (e.g., activity) based incrementation or a parallel solution may be accomplished through time (e.g., time period) incrementation. The serial solution may generate feasible schedules where none, or very few, of the activities can be started earlier without delaying some other activity. An illustrative serial schedule generation scheme may begin by definition of g=1, . . . , n stages, in each of which one activity is selected and scheduled at the earliest precedence and a resource-feasible completion time. Associated with each stage g are two disjoint activity sets. The scheduled set ($S_g$) comprises the activities which have been already scheduled, the eligible set ($D_g$) comprises all activities which are eligible for scheduling. Note that the conjunction of $S_g$ and $D_g$ does not give the set of all activities (J) because, generally, there exist "ineligible activities", which are activities that have not been scheduled and cannot be scheduled at stage g because not all of their predecessors have been scheduled. If $\tilde{R}_k(t)=R_k-\Sigma_j\epsilon_{A(t)}r_{j,k}$ is the remaining capacity of resource type k at time instant t and let $F_g=\{F_j|j\epsilon S_g\}$ be the set of all finishing times. Let $D_g=\{j\epsilon J\backslash S_g|P_j\subseteq S_g\}$ the set of eligible assessments. Then, the assessment engine 126 may generate a schedule based on a serial generation scheme as illustrated by using an equation:

Initialization: $F_0=0, S_0=\{0\}$ (1)

For $g=1$ to $n$ do (2)

Calculate $D_g, F_g, \tilde{R}_k(t)(k\epsilon K; t\epsilon F_g)$ select one $j\epsilon D_g$ $EFj=\max_{h\epsilon P_j}\{F_h\}+p_j$ $Fj=\min\{t\epsilon[DF_j-p_j, LF_j-p_j]\cap F_g|$ $r_{j,k}\leq \tilde{R}_k(\tau), k\epsilon K, \tau\epsilon[t, t+p_j]\cap F_g\}+p_j$ $S_g=S_{g-1}\cup\{j\}$ $F_{n+1}=\max_{h\epsilon P_{n+1}}\{F_h\}$ Here, the initialization assigns a zeroed source activity (j=0) a completion time of 0 as an initial step of the partial schedule. At the beginning of each step g, the decision set $D_g$, the set of finish times $F_g$, and the remaining capacities $\tilde{R}_k(t)$ at the finish times $t\epsilon F_g$ are calculated. After, one activity j is selected from the decision set, where the finish time of j is calculated by first determining the earlies precedence feasible finishing time $EF_j$ and then calculating the earliest precedence and/or resource feasible finish time $F_j$ within $|EF_j, LF_j|$. $LF_J$ represents a latest finish time as calculated by backward recursion from an upper bound of the project's finish time T. Such equations are used as an example, and others may be contemplated. See Kolisch R., Hartmann S. (1999) Heuristic Algorithms for the Resource-Constrained Project Scheduling Problem: Classification and Computational Analysis. In: Węglarz J. (eds) Project Scheduling. International Series in Operations Research & Management Science, vol 14. Springer, Boston, Mass.

While the scheduling engine 126 may be able to generate schedules using such equations for smaller numbers of applications (e.g., less than 50, less than 75) within a reasonable time, for larger assessment data sets (e.g., 1000 applications, 10000 applications, and the like), schedules solutions may take an unreasonable time to complete, if they are able to do so. For example, RCPSP equations tend to be solved using a "brute force" method of attempting to schedule every possible (reasonable) combination. As such, the scheduling engine 126 may use a "guttering" technique, where after solving the RSPSP scheduling problem for a defined time period, a specified time period (e.g., a two-week time period at the end of the year) may be assigned an infinite capacity, such that all remaining applications may be scheduled during that time period. In many cases, the guttering technique reduces processing times for solutions for scheduling large numbers (e.g., thousands) of security assessments to be generated in short time frames (e.g., about 20 minutes). In some cases, a certain percentage, such as 70%-80% of applications 150 may be scheduled for assessments during the year, where the remaining 20%-30% may be scheduled during the "gutter" (e.g., the time period set aside for scheduling a remainder of the unscheduled applications), thus making the scheduling more solvable. The RSPSP algorithm with guttering is scalable to any number of applications and/or timeframes and is not fixed to a year or a certain maximum number of applications. For example, experiments have been run scheduling assessments as few as 10 applications to over 200,000 applications, where the case of 200,000 applications completed, with fewer constraints, in approximately 5 to 10 minutes. The scheduling module may prioritize applications to improve scheduling success, such as by scheduling applications needing longer assessment times and/or more resources to be scheduled earlier. Further, if an application assessment identifies multiple assessments, the multiple assessments for that application may be scheduled to be done in parallel. In some cases, during manual rescheduling, additional resources may be added as needed to assist in rescheduling of the applications assigned to the gutter time period.

Figure 2:
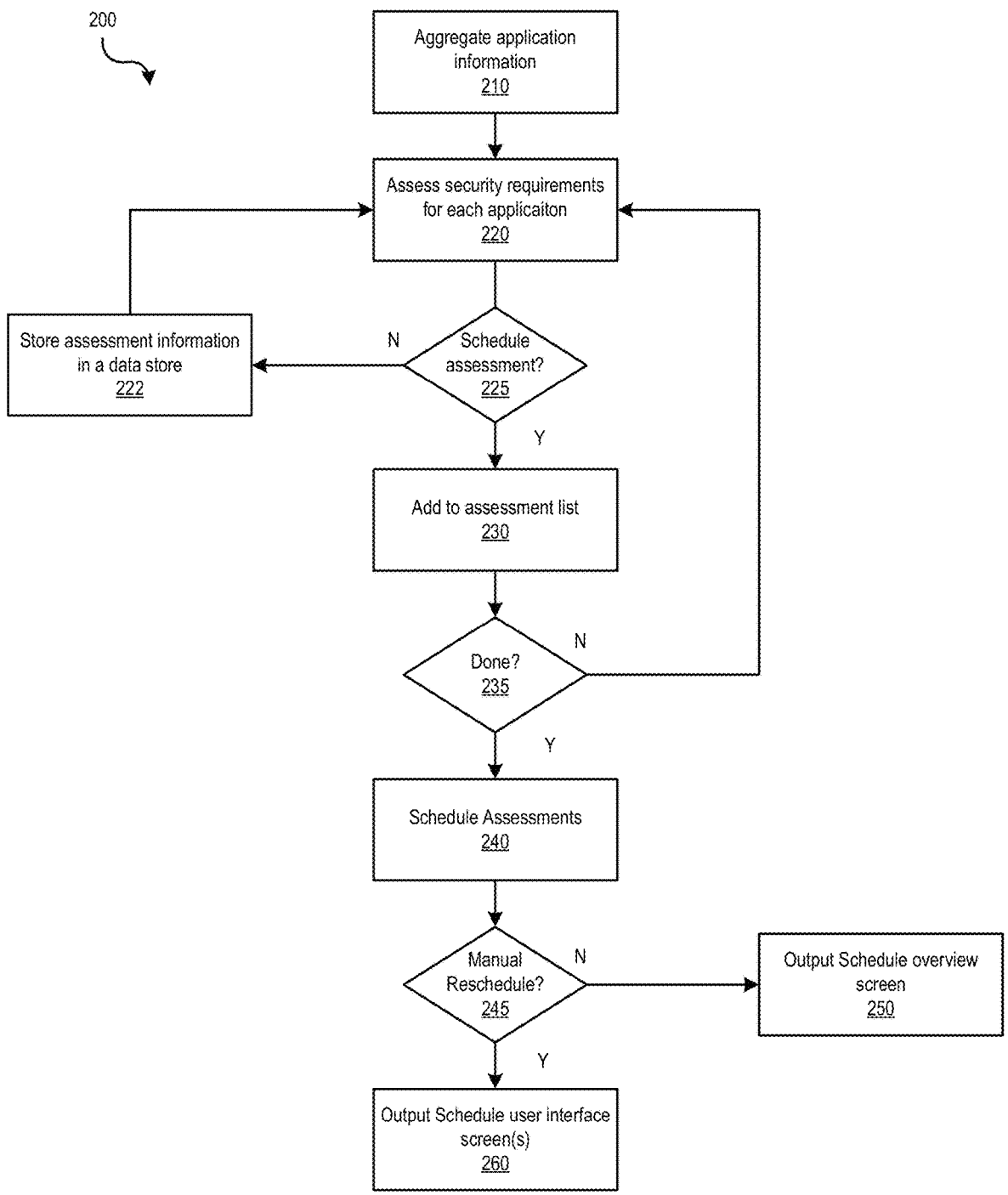
FIG. 2 shows an illustrative method for scheduling security assessments in a computing environment in accordance with one or more aspects described herein.

The user interface module 128 may present one or more user interface screens to allow a user to adjust global values for use by the security assessment scheduling tool, add and remove applications from the scope of the assessment schedule, schedule assessor weeks for each application, and/or preview or download the assessment schedule spreadsheet. FIGS. 3-9, show the functionality provided through use of the user interface module 128 to perform such actions FIG. 2 shows an illustrative method 200 for scheduling security assessments in a computing environment in accordance with one or more aspects described herein. At 210, the aggregation engine 122 may aggregate information associated with a plurality of applications 150 and/or connections to corresponding computing devices 130 and store the aggregated information in the data store 125. At 220, the assessment engine 124 may analyze the aggregated data to assess security assignments for an application of the plurality of applications 150 to determine which applications may require a scheduled security assessment. At 225, if the application does not need a security assessment, the assessment engine 124 may, if the application does not meet assessment criteria, store information memorializing that analysis in a data store at 222, along with reasons why the application does not meet the analyzed criteria for later use. The assessment engine 124 may then assess a security requirement for a different application at 220. At 225, when the application is determined to require an assessment, the application information including an application ID is added to the assessment information in the data store 125. At 235, if further applications need assessing, the assessment module analyzes the next application at 220. If no further applications need assessing, at 235, then the scheduling engine 126 may schedule assessments of the applications 150 requiring a security assessment at 240. If, after the scheduling engine 126 completes scheduling the security assessments of each application based on a RCPSP and the guttering technique, the scheduling engine 126 may determine whether any applications may require rescheduling, such as those assigned to the guttering time period at 245. If not, the user interface module may cause display of an overview user interface screen at 250. If, at 245, manual rescheduling is required, the user interface module 128 may generate one or more user interface screens for display to a user during a manual rescheduling process at 260.

FIG. 3 shows an illustrative user interface screen for editing security assessment schedules according to one or more aspects described herein. Upon logging into the security assessment scheduling tool, the user may be presented with the screen of FIG. 3, where the user may choose a year to schedule and/or reschedule security assessments and initiate the actions they wish to perform. For a current year, the user may adjust the global values for use by the security assessment scheduling tool, add and remove applications from the scope of the assessment schedule, schedule assessor weeks for each application, and/or preview or download the assessment schedule spreadsheet. Additionally, a user interface screen may be used for scheduling additions associated with the applications involved in the guttering process. For an upcoming year, the user interface screen may allow a user to configure global values, verify and/or adjust applications in scope of the assessment schedule, adjust the automatically generated assessment schedule and/or preview or download the assessment schedule. The user interface screen may allow a read-only view of records of security assessment schedules for previous years.

FIG. 4 shows an illustrative user interface screen for configuring global settings for use when automatically generating a security assessment schedule according to one or more aspects described herein. In some cases, the global settings may be used by one or more components of the security assessment scheduling tool to automatically generate a preliminary scoping assessment and/or to generate a schedule for all identified applications. In some cases, the configurable settings may be entered before the assessment engine 124 and/or the scheduling engine 126 begin the automatic generation of the scoping and schedule. In some cases, these settings may be changed throughout the year and may be considered for automatically scheduling of gap additions.

A first section of the user interface screen (e.g., the "Resource Capacity Per Week" section) may provide a representation of available resources (e.g., a number of assessors) that may be assigned to a type of assessment in a single week by the scheduling engine 126, where these values may be used by the scheduling engine 126 to generate a schedule of assessments. A second section of the user interface screen (e.g., the "Comprehensive" list) may list of all comprehensives that can be assigned to an application in the Scoping view. By modifying the list, the user can and/or remove comprehensives for the year. Comprehensives are applications that may be grouped into one or more user-defined categories. For example, "all apps related to vendor X", "network infrastructure apps", "vendor specific contract apps", and the like. As such, comprehensives may be used to group assessments together to coordinate a start time and/or date and/or may otherwise have some impact on how security assessments may be scheduled.

FIG. 5 shows an illustrative user interface screen for reviewing a security assessment schedule according to one or more aspects described herein. In some cases, the user interface screen of FIG. 5 (e.g., a scoping main view user interface screen) may be used to present, to the user, information resulting from the automatic scoping by the assessment module 124, and to facilitate editing of the data if any adjustments are desired. The user interface screen is designed present information that may be necessary to identify which application is being reviewed and to verify whether the application is indeed in scope. The user interface screen includes inputs that allow display of additional details about the application and/or to facilitate additional editing of the data record. In some cases, an input (e.g., the "verified" input button) may be used to allow identification and/or tracking of verified records. The verified input may or may not affect operation of the security assessment scheduling tool. In some cases, verification of the automatic results of the assessment by the assessment module 124 and/or the scheduling by the scheduling module 126 may be required. In some cases, a spot check of each record type (e.g., a check of several of each type of record) may also be performed. In some cases, a "verified" input may be used to identify additional information about records, such as to represent an identification of branded records, either automatically by the aggregation module 122 and/or the assessment module 124, manually, or a combination of both.

In some cases, the user interface screen of FIG. 5 may include one or more filters to alter a view presented to the user via the user interface screen, such as through one or more buttons (e.g., the "verified" button, an "unverified" button, an "in scope" button, an "out of scope" button, an "all records" button, a "comprehensive" button, a "team" button, a "possible branding" button and the like. For example, a team button may be associated with work to be performed by a specific team or group associated with the enterprise when performing application security assessments. For example, applications in enterprises tend to receive assessments where the application is assessed from various perspectives: application security, network security, vendor security, and the like. As such, it may be preferable to keep all the different security programs aligned so that the security assessments may be scheduled together rather than spread throughout the year. In some cases, the records may be sorted through use of an additional "sort input" such as to sort by ID number, application name and/or the like. In an illustrative example, the filter may work as an "AND" operation between sets of buttons, where a single one button of each set may be active at a given time. In the example shown in FIG. 5, the user interface screen shows "Unverified" records that are "In Scope" and part of a "Comprehensive". Here, for example, the first set of buttons provides a configuration to allow the user to input a choice between Unverified and Verified records and additionally may show an amount of each record type corresponding to the current search criteria. The next set of buttons may allow a user to toggle between a view showing In Scope records, Out of Scope records, or All Records for the certain search criteria. A third set of buttons may be used to allow the user to input a choice to view records with Comprehensives, a team Date, or to filter for records that have been identified as including possible branding associated with the enterprise.

A search box may be used to allow the user to filter the results based on a string match of any of the fields visible in an associated list. In the id number list, the first row may be used to show identifying information for each record. A second row may be used to show an output of the automated scoping performed by the assessment engine 124 and may be used to select information that was used to generate that output. The user may be allowed to mark a record as being verified by clicking on the associated input (e.g., a check box). Additionally, by selecting the "details" button, a scoping details view user interface screen may be opened for the associated record FIG. 6 shows an illustrative user interface screen for editing a security assessment schedule according to one or more aspects described herein. The illustrative user interface screen shown in FIG. 6 may show a "Scoping Details View" that presents to the user fully imported and calculated information associated with a particular record. Such information may override any automatically generated results. In some cases, a portion of the user interface screen (e.g. a top half of the view) may include editable controls and a second portion of the user interface screen (e.g., the bottom half of the view) may be used to display read-only information such as through use of collapsible sections.

In some cases, an input may allow a user to add or remove records from a current year's scope. Additionally, another user input may be used to mark records as being "verified". The series of checkboxes in the status section may be overwritten if the existing assessment types for this record are determined to be incorrect. For example, these checkboxes represent whether or not a particular type of assessment is present. In addition, an actual amount of resources may be shown in the scheduling views. A "Primary Information" collapsible section may be used to display identifying information that may be used, for example, by the user to identify an application. A "Previous Year" collapsible section may display assessment information for this application from a prior calendar year. The "Report" collapsible information section may be used to show information imported from an application that was used to generate automated scoping decisions. This information may be duplicated here so that the user will not have to open the application when the user interface screen is viewable at the same time to make scoping decisions. A "team" collapsible information section may display information corresponding to any scheduled team assessments.

Figure 7:
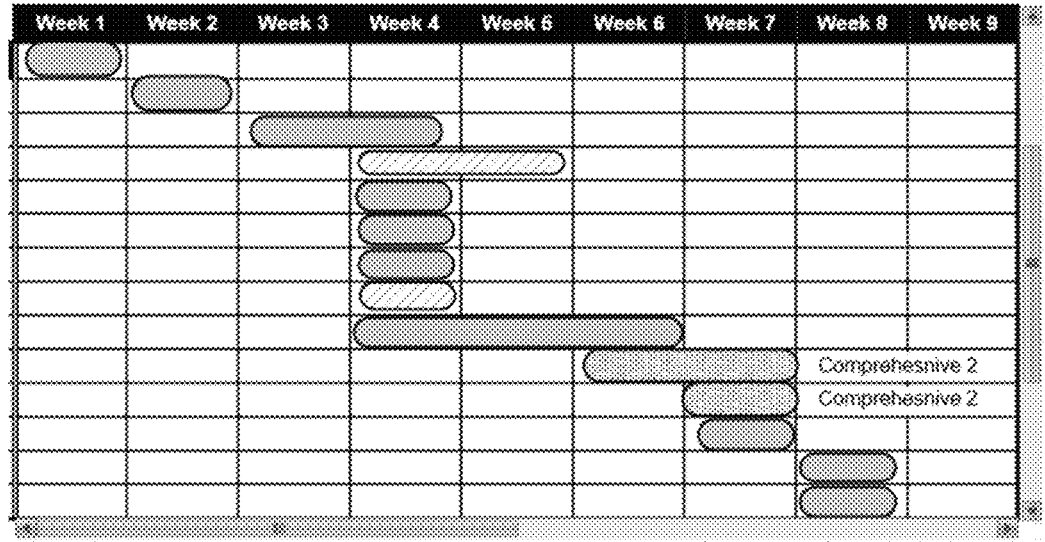
FIG. 7 shows an illustrative user interface screen showing a security assessment schedule according to one or more aspects described herein.

FIG. 7 shows an illustrative user interface screen showing a security assessment schedule according to one or more aspects described herein. In some cases, the illustrative user interface screen of FIG. 7 may show a "Scheduling Dates Main View" user interface screen that may be used to display an overall schedule of assessments and their associated applications in the form of a table and Gantt Chart. This user interface screen may present, to the user, the many different applications have an assessment during any particular week. Additionally, the user interface screen may present information showing what types of assessments are scheduled and a number of resources assigned to each assessment type.

In some cases, records may have scheduled priority based on an order comprising
1—All Comprehensives
2—Records in alignment with a team
3—Applications that require SCA and SCA Mobile assessments
4—Any other records.
A filter may be used to allow user review of assigned priorities to ensure an expected priority ordering scheme has been followed by the automatically generated schedule. Such filters may be used to assist the user when performing gap additions. In some cases, the search input may facilitate filtering by any of the primary record information fields, not just the information displayed in the table illustrated in FIG. 7. The informational table may display the application ID number, the application name, and the scheduled resources organized by assessment type. If there is more than 1 week of 1 resource for a particular assessment type, the allocation may be displayed in a particular format (e.g., "#weeks x #resources"). Additionally, a start date and the month of the team assessment, if scheduled, to help with alignment. In some cases, the Gantt chart may display an overall date range for all assessments for a particular application. Here, a length of the bar may be representative of a number of weeks that the associated application's assessments are scheduled to run. In this example, 1 row is used per application. As such, if multiple assessment types are involved, the longest assessment type may be shown. For example, if an assessment has 1 resource scheduled for 1 week for a first assessment type, and 3 resources scheduled for 3 weeks for a second assessment type, the bar would be 3 weeks wide. In some cases, team aligned applications may be represented through use of a third color for comprehensive assessments. Additionally, comprehensive assessments will also be labeled with the "Comprehensive" name by the bar in the Gantt chart.

Figure 8:
FIG. 8 shows an illustrative user interface screen for editing an automatically generated security assessment schedule according to one or more aspects described herein.

FIG. 8 shows an illustrative user interface screen for editing an automatically generated security assessment schedule according to one or more aspects described herein. The illustrative user interface screen of FIG. 8 may comprise a detailed view of scheduled assessments for an application. This user interface screen may be used to change the allocated resource amounts and/or weeks of work. The user may also reschedule the start date of all assessments to a new day.

In an illustrative example, the illustrative user interface screen may allow a rescheduling assistant module to reschedule an application start date from an automatically scheduled date (e.g., <dd1/mm1/yyyy>) to a different date (e.g., <dd2/mm2/yyyy). Such rescheduling would be difficult to reschedule manually as it has multiple types of assessments with different lengths and numbers of resources. For example, the first assessment type involves 1 resource and lasts 1 week, a second assessment involving 3 resources over 3 weeks, and a third assessment involving 1 resource over two weeks. The rescheduling assistant module, via the user interface screen, may show the user a visual indication of the weekly count of resources across the assessments for all application ids and how these resources may be affected due to the change in a single assessment's start date. For example, for a first week, 1 resource for a first type, 3 resources for a second type and 1 resource for a third type have been subtracted. As such, due to the moved start date, these resources are no longer allocated. For the second week, 1 resource of the first type has been added, and other resources stay the same because they were already allocated when the application had a start date in the first week and are still necessary with the changed start date to the second week. For the third week, 1 resource of the fourth type has been added, while the other resources remain the same from allocation from the previous start date. For the fourth week, three resources were added to the type 2 resource total because, for this application, the type 2 scans end on this date.

The Current Allocation section of the user interface screen allows the user to change the resource and/or week amounts. The Rescheduling Assistant section allows the user to set a new start date for all assessments. For informational purposes, the previous year start date and team month is shown. The tally view chart may be based on a manual tally sheet process used to schedule assessments may be read only to provide a visual representation to the user to verify resource allocations (e.g., show whether the automatic scheduling process is allocating too many resources for any one week). The illustrative example is a complicated example of what can be done with the application. In some cases, assessment reassignments may involve reassigning a single resource for a single week.

FIG. 9 shows an illustrative user interface screen for downloading a security assessment schedule according to one or more aspects described herein. After the schedule and scoping has been completed, the user interface screen of FIG. 9 may be presented to a user via a display at a user device to allow the user to download scheduling information (e.g., a spreadsheet) such that the schedule may be reviewed and/or provided to application managers to inform them of their assessments and preliminary schedules. For example, the user interface screen may allow a download so that a user can save a copy of the customer assessment view spreadsheet. Also, the user interface screen may allow the user to preview the content of the spreadsheet before download.

Figure 10:
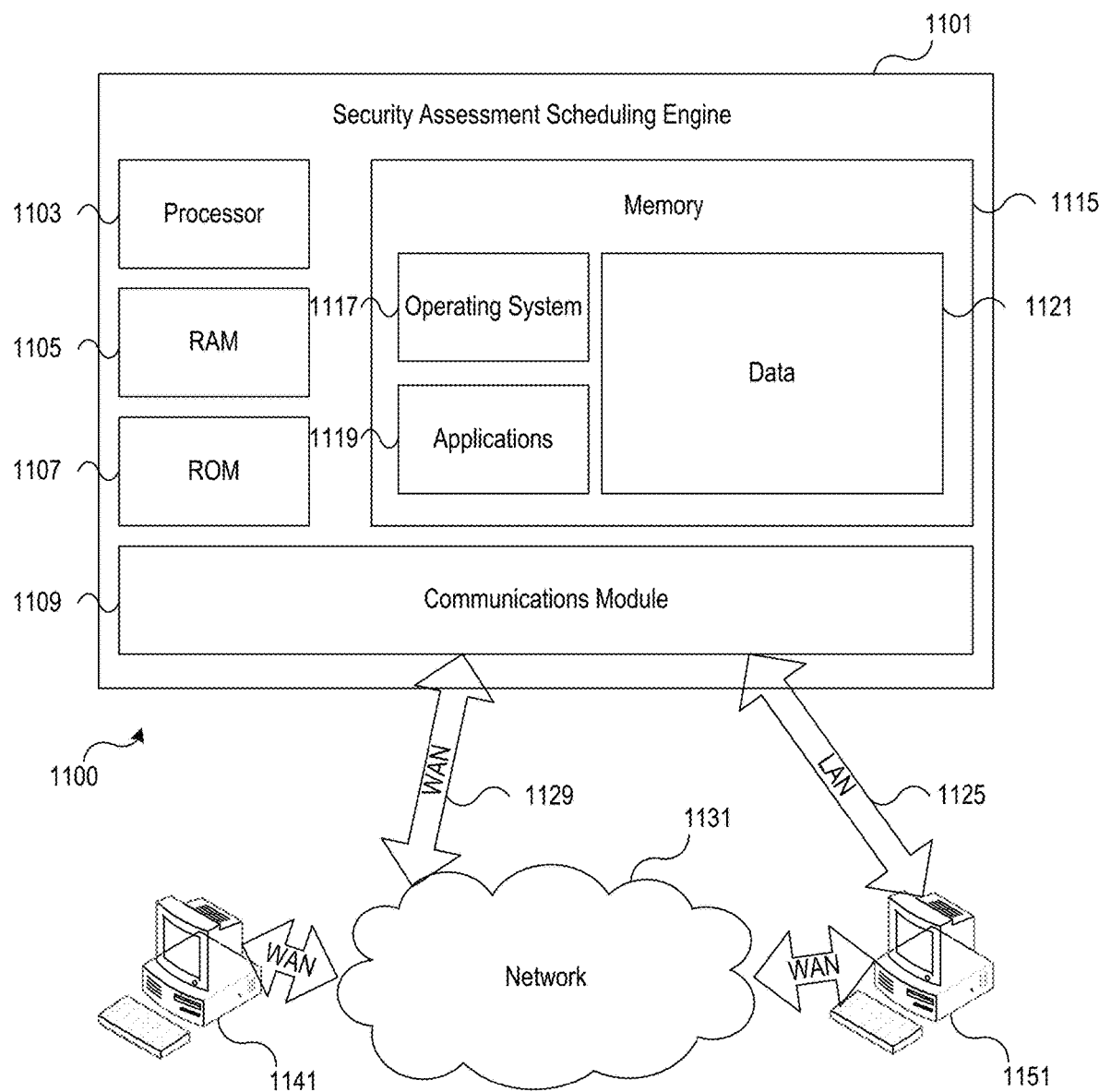
FIG. 10 shows an illustrative computing environment in which various aspects of the disclosure may be implemented in accordance with one or more aspects described herein.

FIG. 10 shows an illustrative operating environment in which various aspects of the present disclosure may be implemented in accordance with one or more example embodiments. Referring to FIG. 10 a computing system environment 1100 may be used according to one or more illustrative embodiments. The computing system environment 1100 is only one example of a suitable computing environment and is not intended to suggest any limitation as to the scope of use or functionality contained in the disclosure. The computing system environment 1100 should not be interpreted as having any dependency or requirement relating to any one or combination of components shown in the illustrative computing system environment 1100.

The computing system environment 1100 may include an illustrative security assessment scheduling engine 1101 having a processor 1103 for controlling overall operation of the security assessment scheduling engine 1101 and its associated components, including a Random Access Memory (RAM) 1105, a Read-Only Memory (ROM) 1107, a communications module 1109, and memory 1115. The security assessment scheduling engine 1101 may include a variety of computer readable media. Computer readable media may be any available media that may be accessed by the security assessment scheduling engine 1101, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the security assessment scheduling engine 1101.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 1103 of the security assessment scheduling engine 1101. Such a processor may execute computer-executable instructions stored on a computer-readable medium.

Software may be stored within the memory 1115 and/or other digital storage to provide instructions to the processor 1103 for enabling the security assessment scheduling engine 1101 to perform various functions as discussed herein. For example, the memory 1115 may store software used by the security assessment scheduling engine 1101, such as an operating system 1117, one or more application programs 1119, and/or an associated database 1121. In addition, some or all of the computer executable instructions for the security assessment scheduling engine 1101 may be embodied in hardware or firmware. Although not shown, the RAM 1105 may include one or more applications representing the application data stored in the RAM 1105 while the security assessment scheduling engine 1101 is on and corresponding software applications (e.g., software tasks) are running on the security assessment scheduling engine 1101.

The communications module 1109 may include a microphone, a keypad, a touch screen, and/or a stylus through which a user of the security assessment scheduling engine 1101 may provide input, and may include one or more of a speaker for providing audio output and a video display device for providing textual, audiovisual and/or graphical output. The computing system environment 1100 may also include optical scanners (not shown).

The security assessment scheduling engine 1101 may operate in a networked environment supporting connections to one or more remote computing devices, such as the computing devices 1141 and 1151. The computing devices 1141 and 1151 may be personal computing devices or servers that include any or all of the elements described above relative to the security assessment scheduling engine 1101.

The network connections depicted in FIG. 10 may include a Local Area Network (LAN) 1125 and/or a Wide Area Network (WAN) 1129, as well as other networks. When used in a LAN networking environment, the security assessment scheduling engine 1101 may be connected to the LAN 1125 through a network interface or adapter in the communications module 1109. When used in a WAN networking environment, the security assessment scheduling engine 1101 may include a modem in the communications module 1109 or other means for establishing communications over the WAN 1129, such as a network 1131 (e.g., public network, private network, Internet, intranet, and the like). The network connections shown are illustrative and other means of establishing a communications link between the computing devices may be used. Various well-known protocols including, but not limited to, protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 11:
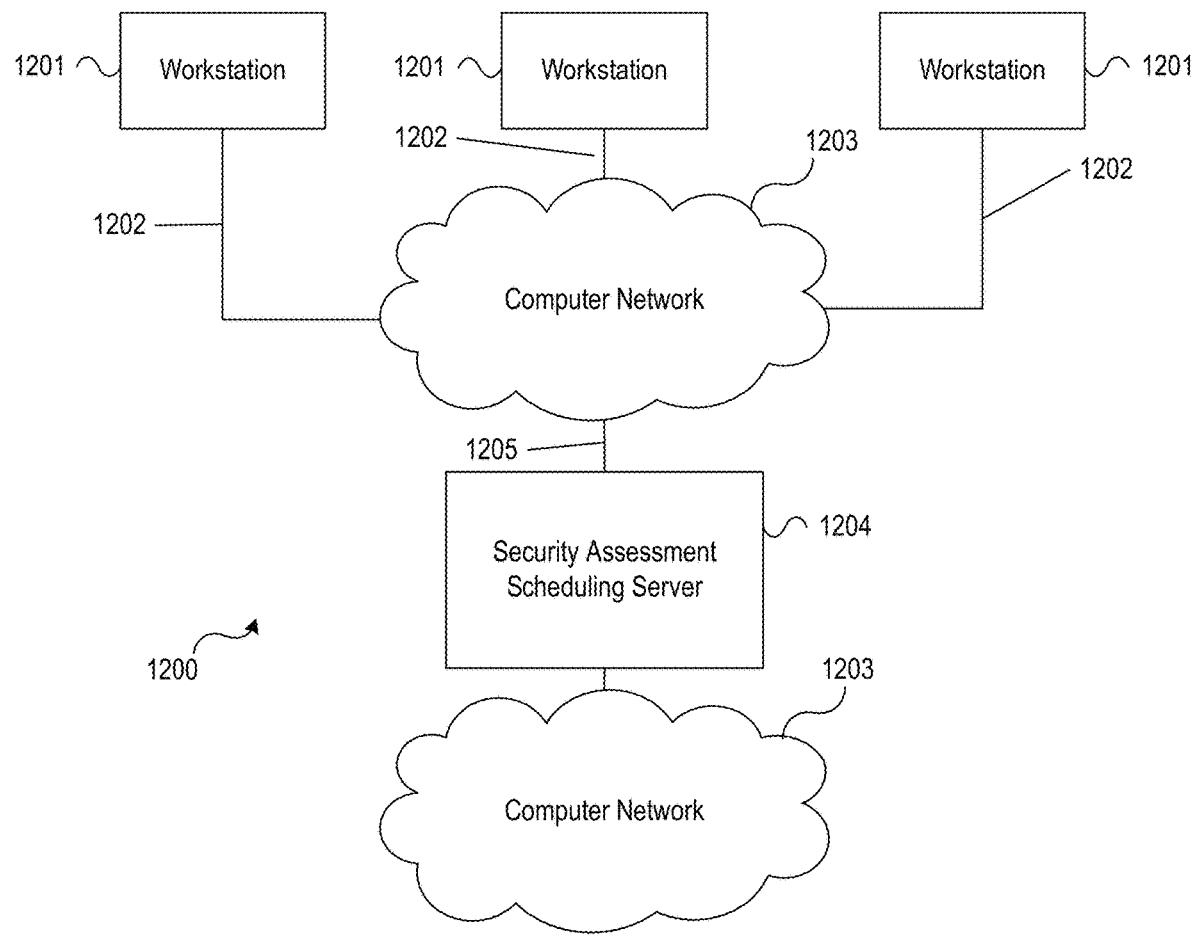
FIG. 11 shows an illustrative block diagram of workstations and servers that may be used to implement the processes and functions of certain aspects of the present disclosure in accordance with one or more aspects described herein.

FIG. 11 shows an illustrative block diagram of workstations and servers that may be used to implement the processes and functions of certain aspects of the present disclosure in accordance with one or more example embodiments. For example, an illustrative system 1200 may be used for implementing illustrative embodiments according to the present disclosure. As illustrated, the system 1200 may include one or more workstation computers 1201. The workstation 1201 may be, for example, a desktop computer, a smartphone, a wireless device, a tablet computer, a laptop computer, and the like, configured to perform various processes described herein. The workstations 1201 may be local or remote, and may be connected by one of the communications links 1202 to a computer network 1203 that is linked via the communications link 1205 to a security assessment scheduling engine 1204. In the system 1200, the security assessment scheduling engine 1204 may be a server, processor, computer, or data processing device, or combination of the same, configured to perform the functions and/or processes described herein. The security assessment scheduling engine 1204 may be used for scheduling of security assessments for a plurality of server-based applications.

The computer network 1203 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 1202 and 1205 may be communications links suitable for communicating between the workstations 1201 and the security assessment scheduling engine 1204, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A method comprising:
   automatically assessing, by an assessment engine via a network and based on a business rules engine, a plurality of applications to identify which of the applications are to be scheduled for a security assessment, wherein the security assessment comprises an identified security vulnerability and an identified security assessment type;
   generating, automatically by a scoping engine and scheduling engine, an assessment schedule for each of the plurality of applications to be assessed based, in part, on a resourced constrained project scheduling problem (RCPSP) algorithm, wherein a portion of the security assessments are assigned to a specified time period;
   adjusting, by the scoping engine and based on a count of the plurality of applications being greater than a threshold, operation of the RCPSP algorithm operation after a defined runtime duration, wherein the scoping engine assigns a second plurality of applications to a guttering time period, wherein the second plurality of applications comprise the plurality of applications that remain unscheduled after the defined runtime duration and the guttering time period comprises a defined time period of infinite capacity;
   causing display, at a user interface screen associated with a user device, a visual representation of the assessment schedule; and
   initiate performance of actions associated with the assessments based on the assessment schedule.

2. The method of claim 1, wherein generating the assessment schedule for each of the plurality of applications to be assessed comprises:
   processing, assessment information associated with the application based on the RCPSP algorithm for a defined time period; and
   automatically scheduling, when the defined time period has elapsed, security assessments for remaining unscheduled applications of the plurality of applications to the specified time period.

3. The method of claim 1 wherein the plurality of applications comprises more than 1000 applications.

4. The method of claim 1, comprising configuring, based on a configuration file, types of security assessments to be performed and a number of resources available for performance of each type of security assessment.

5. The method of claim 1, further comprising:
causing presentation, via a network, display of a user interface screen including a user accessible input to facilitate changing an assigned time period to an application security assessment.

6. The method of claim 5, further comprising:
automatically calculating resource requirements for a plurality of time periods near a changed time period; and
causing display, via a network and at a display device of a user computing device, a user interface screen having a chart showing the resource requirements associated with each of the plurality of time periods near the changed time period.

7. A computing device, comprising:
a processor; and
memory storing instructions that, when executed by the processor, cause the computing device to:
assess, automatically by an assessment engine via a network and based on a business rules engine, a plurality of applications to identify which of the applications are to be scheduled for a security assessment, wherein the security assessment comprises an identified security vulnerability and an identified security assessment type;
generate, automatically by a scheduling engine, an assessment schedule for each of the plurality of applications to be assessed based, in part, on a resourced constrained project scheduling problem (RCPSP) algorithm, wherein a portion of the security assessments are assigned to a specified time period;
adjust, by a scoping engine and based on a count of the plurality of applications being greater than a threshold, operation of the RCPSP algorithm operation after a defined runtime duration, wherein the scoping engine assigns a second plurality of applications to a guttering time period, wherein the second plurality of applications comprise the plurality of applications that remain unscheduled after the defined runtime duration and the guttering time period comprises a defined time period of infinite capacity;
cause display, at a user interface screen associated with a user device, a visual representation of the assessment schedule; and
initiate performance of actions associated with the assessments based on the assessment schedule.

8. The computing device of claim 7, wherein the instructions, when executed, cause the computing device to:
process, assessment information associated with the application based on the RCPSP algorithm for a defined time period; and
automatically schedule, when the defined time period has elapsed, security assessments for remaining unscheduled applications of the plurality of applications to the specified time period.

9. The computing device of claim 7 wherein the plurality of applications comprises more than 1000 applications.

10. The computing device of claim 7, wherein the instructions, when executed, cause the computing device to:
configure, based on a configuration file, types of security assessments to be performed and a number of resources available for performance of each type of security assessment.

11. The computing device of claim 7, wherein the instructions, when executed, cause the computing device to:
cause presentation, via a network, display of a user interface screen including a user accessible input to facilitate changing an assigned time period to an application security assessment.

12. The computing device of claim 11, wherein the instructions, when executed, cause the computing device to:
automatically calculate resource requirements for a plurality of time periods near a changed time period; and
cause display, via a network and at a display device of a user computing device, a user interface screen having a chart showing the resource requirements associated with each of the plurality of time periods near the changed time period.

13. One or more non-transitory computer-readable media storing instructions that, when executed by a computing device comprising a processor, memory, and a communication interface, cause the computing device to:
assess, automatically by an assessment engine via a network and based on a business rules engine, a plurality of applications to identify which of the applications are to be scheduled for a security assessment, wherein the security assessment comprises an identified security vulnerability and an identified security assessment type;
generate, automatically by a scheduling engine, an assessment schedule for each of the plurality of applications to be assessed based, in part, on a resourced constrained project scheduling problem (RCPSP) algorithm, wherein a portion of the security assessments are assigned to a specified time period;
adjust, by a scoping engine and based on a count of the plurality of applications being greater than a threshold, operation of the RCPSP algorithm operation after a defined runtime duration, wherein the scoping engine assigns a second plurality of applications to a guttering time period, wherein the second plurality of applications comprise the plurality of applications that remain unscheduled after the defined runtime duration and the guttering time period comprises a defined time period of infinite capacity;
cause display, at a user interface screen associated with a user device, a visual representation of the assessment schedule; and
initiate performance of actions associated with the assessments based on the assessment schedule.

14. The one or more non-transitory computer-readable media of claim 13, wherein the instructions, when executed by the processor, cause the computing device to:
process, assessment information associated with the application based on the RCPSP algorithm for a defined time period; and
automatically schedule, when the defined time period has elapsed, security assessments for remaining unscheduled applications of the plurality of applications to the specified time period.

15. The one or more non-transitory computer-readable media of claim 13, wherein the plurality of applications comprises more than 1000 applications.

16. The one or more non-transitory computer-readable media of claim 13, wherein the instructions, when executed, cause the computing device to configure, based on a configuration file, types of security assessments to be performed and a number of resources available for performance of each type of security assessment.

17. The one or more non-transitory computer-readable media of claim 13, wherein the instructions, when executed, cause the computing device to cause presentation, via a network, display of a user interface screen including a user accessible input to facilitate changing an assigned time period to an application security assessment.

18. The one or more non-transitory computer-readable media of claim 17, wherein the instructions, when executed, cause the computing device to:
- automatically calculate resource requirements for a plurality of time periods near a changed time period; and
- cause display, via a network and at a display device of a user computing device, a user interface screen having a chart showing the resource requirements associated with each of the plurality of time periods near the changed time period.

* * * * *